United States Patent
Ha et al.

(10) Patent No.: US 10,459,297 B2
(45) Date of Patent: Oct. 29, 2019

(54) LIQUID CRYSTAL DISPLAY DEVICE INCLUDING LIQUID CRYSTAL CAPSULE AND METHOD OF FABRICATING THE SAME

(71) Applicant: LG DISPLAY CO., LTD., Seoul (KR)

(72) Inventors: Kyung-Su Ha, Gwangju (KR); Sang-Wook Lee, Paju-si (KR); Won-Taeck Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 58 days.

(21) Appl. No.: 15/710,232

(22) Filed: Sep. 20, 2017

(65) Prior Publication Data
US 2018/0120608 A1 May 3, 2018

(30) Foreign Application Priority Data
Oct. 27, 2016 (KR) ........................ 10-2016-0141037

(51) Int. Cl.
*G02F 1/1343* (2006.01)
*G02F 1/1334* (2006.01)
*G02F 1/16757* (2019.01)
*G02F 1/1335* (2006.01)
*G02F 1/1333* (2006.01)
*G02F 1/137* (2006.01)

(52) U.S. Cl.
CPC .......... *G02F 1/1343* (2013.01); *G02F 1/1334* (2013.01); *G02F 1/133345* (2013.01); *G02F 1/133528* (2013.01); *G02F 1/133305* (2013.01); *G02F 1/133602* (2013.01); *G02F 2001/13706* (2013.01); *G02F 2001/13712* (2013.01); *G02F 2202/36* (2013.01)

(58) Field of Classification Search
CPC ............. G02F 1/1343; G02F 1/133345; G02F 1/133528
See application file for complete search history.

(56) References Cited

U.S. PATENT DOCUMENTS

| | | | | |
|---|---|---|---|---|
| 2012/0249928 A1* | 10/2012 | Kaihoko | .............. | G02B 5/3083 349/69 |
| 2014/0313462 A1* | 10/2014 | Kibe | ................. | G02F 1/134309 349/106 |
| 2016/0011443 A1* | 1/2016 | Jeon | .................. | G02F 1/133634 349/43 |

* cited by examiner

*Primary Examiner* — Edward J Glick
*Assistant Examiner* — Anthony G Quash
(74) *Attorney, Agent, or Firm* — Birch, Stewart, Kolasch & Birch, LLP (57) ABSTRACT

A liquid crystal display device includes a substrate; a pixel electrode and a common electrode in a pixel region on the substrate and spaced apart from each other; and a liquid crystal layer on the pixel electrode and the common electrode and including a first liquid crystal capsule and a second liquid crystal capsule, wherein the first liquid crystal capsule includes first liquid crystal molecules having positive dielectric constant anisotropy and the second liquid crystal capsule includes second liquid crystal molecules having negative dielectric constant anisotropy.

20 Claims, 6 Drawing Sheets

FIG. 1

Related Art

LIQUID CRYSTAL DISPLAY DEVICE INCLUDING LIQUID CRYSTAL CAPSULE AND METHOD OF FABRICATING THE SAME

CROSS-REFERENCE TO RELATED APPLICATION

The present application claims priority from and the benefit under 35 U.S.C § 119(a) of Korean Patent Application No. 10-2016-0141037 filed on Oct. 27, 2016, which is hereby incorporated by reference in its entirety.

BACKGROUND OF THE INVENTION

Field of the Disclosure

The present disclosure relates to a liquid crystal display device, and more particularly, to a liquid crystal display device including liquid crystal capsules, which compensates color shift and improves an aperture ratio and transmittance, and a method of fabricating the same.

Discussion of the Related Art

Recently, as the information age progresses, display devices processing and displaying a large amount of information have rapidly advanced. For example, various flat panel displays (FPDs) having a thin profile, a light weight and low power consumption have been researched.

As a result, a thin film transistor liquid crystal display (TFT-LCD) device having an excellent color reproducibility and a thin profile has been developed. The TFT-LCD device displays an image using an optical anisotropy and a polarization property of a liquid crystal molecule.

The TFT-LCD device includes first and second substrates facing and spaced apart from each other and a liquid crystal layer between the first and second substrates. Since the TFT-LCD device includes two glass substrates, a weight and a thickness of the TFT-LCD device increases and it is not easy to apply the TFT-LCD device to a flexible display device.

To improve the above disadvantage, an TFT-LCD device including liquid crystal capsules has been suggested in which a liquid crystal layer having the liquid crystal capsules may be formed through a coating method.

The TFT-LCD device including liquid crystal capsules changes effective refractive index anisotropy (or average refractive index anisotropy) in accordance with an electric field and thus displays gray levels.

Meanwhile, color shift may occur that colors vary according to view angles in the TFT-LCD device, and a quality of displaying an image may be lowered.

To improve the color shift, a multi-domain structure in which a pixel region includes a plurality of domains has been suggested, and this will be described with reference to FIG. 1.

Figure 1:
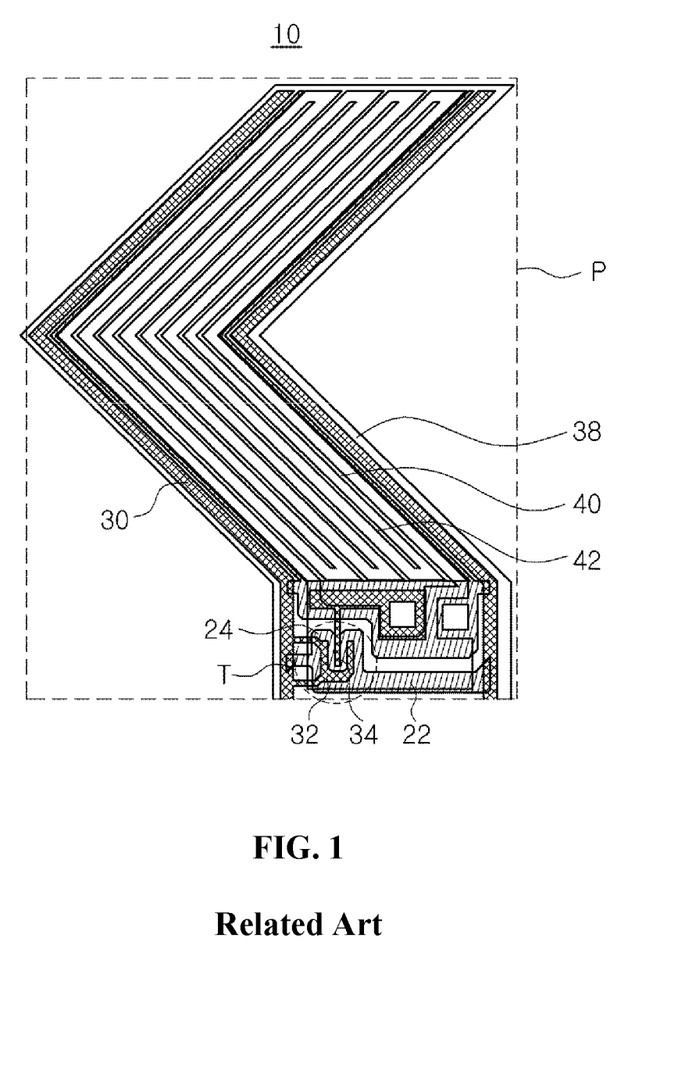
FIG. 1 is a schematic view of a related art TFT-LCD device including liquid crystal capsules.

FIG. 1 is a schematic view of a related art TFT-LCD device including liquid crystal capsules.

In FIG. 1, the related art TFT-LCD device 10 includes a gate line 22 and a data line 30 crossing each other to define a pixel region P and a thin film transistor T connected to the gate line 22 and the data line 30.

The thin film transistor T includes a gate electrode 24, a semiconductor layer, a source electrode 32, and a drain electrode 34. The gate electrode 24 is connected to the gate line 22, and the semiconductor layer is disposed over the gate electrode 24. The source electrode 32 is disposed over the semiconductor layer and connected to the data line 30. The drain electrode 34 is disposed over the semiconductor layer and spaced apart from the source electrode 32.

A common line 38 is disposed over the data line 30. A pixel electrode 40 and a common electrode 42 are disposed in the pixel region P. The pixel electrode 40 is connected to the drain electrode 34, and the common electrode 42 is connected to the common line 38 and alternates with the pixel electrode 40.

Here, an electric field is generated between the pixel electrode 40 and the common electrode 42 by applying a voltage, and refractive index anisotropy of liquid crystal capsules of a liquid crystal layer over the pixel electrode 40 and the common electrode 42 is induced according to the electric field, thereby changing transmittance of light. As a result, gray levels are displayed.

At this time, to improve the color shift, the pixel electrode 40 and the common electrode 42 have a zigzag shape including a curved portion. An electric field of −45 degrees with respect to a left and right horizontal direction is generated in an upper area of the pixel region P and an electric field of +45 degrees with respect to the left and right horizontal direction is generated in a lower area of the pixel region P due to the curved portion.

Therefore, light passing through the liquid crystal layer in the upper area of the pixel region P has the refractive index anisotropy different from light passing through the liquid crystal layer in the lower area of the pixel region P, thereby improving the color shift.

By the way, the TFT-LCD device 10 having a 2-domain structure as stated above has a problem that the aperture ratio decreases due to the zigzag shape of the pixel electrode 40 and the common electrode 42.

Namely, in the related art TFT-LCD device 10 having a 2-domain structure, the data line 30 and the common line 38 are also formed to have a zigzag shape similar to the pixel electrode 40 and the common electrode 42. Thus, a width of each of the pixel electrode 40, the common electrode 42 and the data line 30 increases in order to maintain a same distance between adjacent ones of the pixel electrode 40, the common electrode 42 and the data line 30. An area ratio of an area for displaying an image in the pixel region P decreases, and the aperture ratio of the TFT-LCD device 10 decreases. Accordingly, the transmittance of the TFT-LCD device 10 decreases.

Particularly, in the TFT-LCD device 10 including liquid crystal capsules in which the refractive index anisotropy is induced by the electric field, the pixel electrode 40 and the common electrode 42 are disposed at the angles of +45 degrees and −45 degrees with respect to the left and right horizontal direction, and thus there is a problem that the aperture ratio and the transmittance decrease more.

For example, when there are 8 blocks between the pixel electrode 40 and the common electrode 42 in the pixel region P and the distance between the pixel electrode 40 and the common electrode 42 is about 5.7 µm, the aperture ratio decreases to about 47.40%.

In the meantime, to improve the color shift, a compensation film may be used. However, in this instance, there is a problem that manufacturing costs of the TFT-LCD device increase due to an additional compensation film.

SUMMARY OF THE INVENTION

Accordingly, the present disclosure is directed to an TFT-LCD device including liquid crystal capsules and a method of fabricating the same that substantially obviate one or more of the problems due to limitations and disadvantages of the related art.

An object of the present disclosure is to provide an TFT-LCD device including liquid crystal capsules and a method of fabricating the same compensating the color shift autonomously.

Another object of the present disclosure is to provide an TFT-LCD device including liquid crystal capsules and a method of fabricating the same improving the aperture ratio and the transmittance.

Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description and claims hereof as well as the appended drawings.

To achieve these and other advantages and in accordance with the purpose of the present disclosure, as embodied and broadly described herein, there is provided an TFT-LCD device that includes a substrate; a pixel electrode and a common electrode in a pixel region on the substrate and spaced apart from each other; and a liquid crystal layer on the pixel electrode and the common electrode and including a first liquid crystal capsule and a second liquid crystal capsule, wherein the first liquid crystal capsule includes first liquid crystal molecules having positive dielectric constant anisotropy and the second liquid crystal capsule includes second liquid crystal molecules having negative dielectric constant anisotropy.

In another aspect, a method of fabricating a liquid crystal display device includes forming a pixel electrode and a common electrode in a pixel region on a substrate and spaced apart from each other; and forming a liquid crystal layer on the pixel electrode and the common electrode and including a first liquid crystal capsule and a second liquid crystal capsule, wherein the first liquid crystal capsule includes first liquid crystal molecules having positive dielectric constant anisotropy and the second liquid crystal capsule includes second liquid crystal molecules having negative dielectric constant anisotropy.

It is to be understood that both the foregoing general description and the following detailed description are by example and explanatory and are intended to provide further explanation of the present disclosure as claimed.

BRIEF DESCRIPTION OF THE DRAWINGS

The accompanying drawings, which are included to provide a further understanding of the present disclosure and which are incorporated in and constitute a part of this specification, illustrate embodiments of the present disclosure and together with the description serve to explain the principles of the present disclosure. In the drawings.

DETAILED DESCRIPTION OF THE EMBODIMENTS

Reference will now be made in detail to embodiments of the disclosure, examples of which are illustrated in the accompanying drawings.

Figure 2:
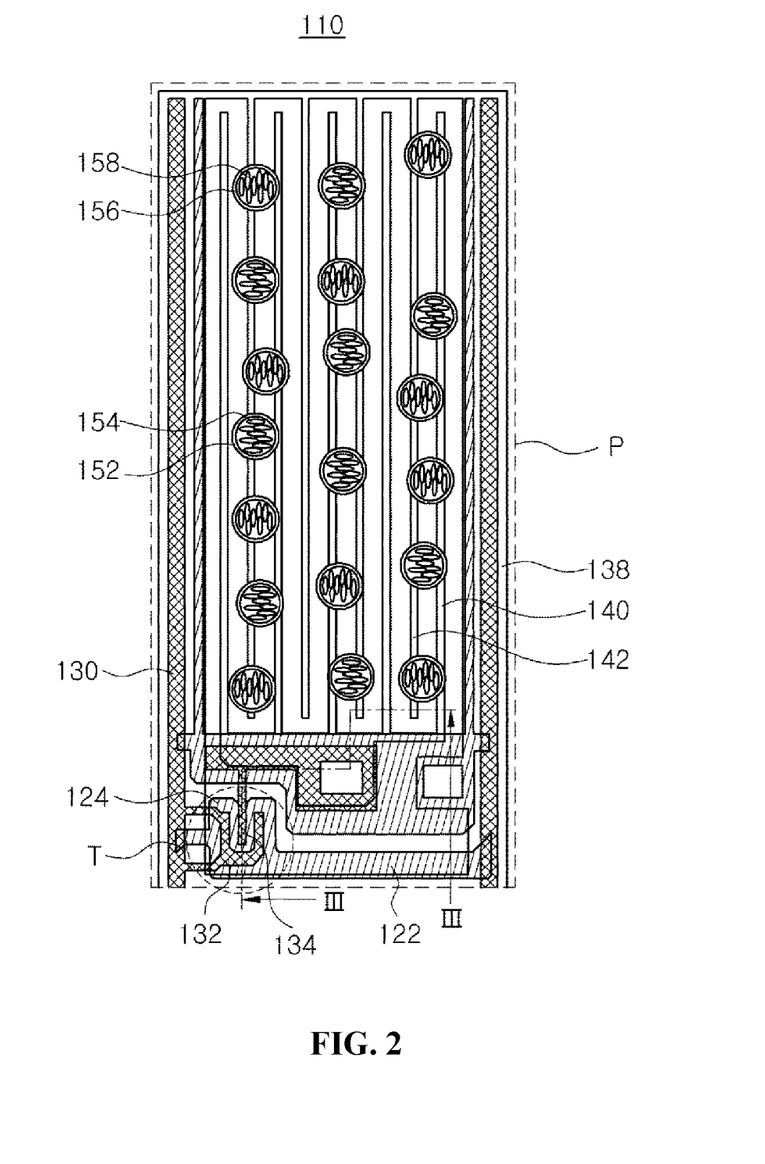
FIG. 2 is a schematic view of an TFT-LCD device including liquid crystal capsules according to a first embodiment of the present disclosure.
Figure 3:
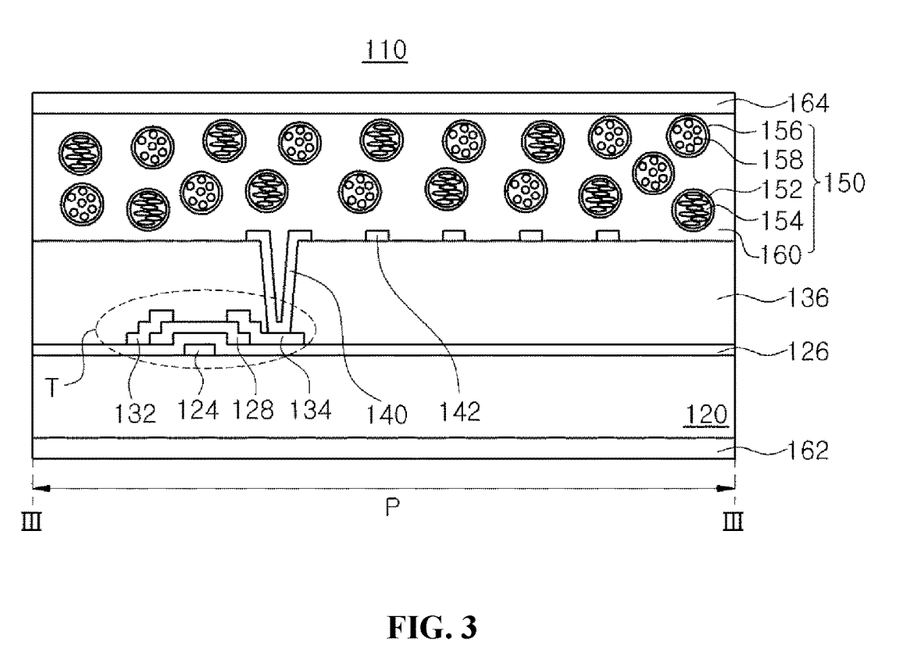
FIG. 3 is a cross-sectional view taken along the line of FIG. 2.

FIG. 2 is a schematic view of an TFT-LCD device including liquid crystal capsules according to a first embodiment of the present disclosure, and FIG. 3 is a cross-sectional view taken along the line of FIG. 2. For convenience of explanation, FIGS. 2 and 3 show liquid crystal molecules of the liquid crystal capsules rearranged by an electric field induced between electrodes.

In FIGS. 2 and 3, the TFT-LCD device 110 including liquid crystal capsules according to the first embodiment of the present disclosure comprises a substrate 120 including a plurality of pixel regions P, a liquid crystal layer 150 over the substrate 120 and a backlight unit under the substrate 120. The substrate 120 and the liquid crystal layer 150 constitute a liquid crystal panel.

More specifically, a gate line 122 and a gate electrode 124 are formed on the substrate 120. The gate line 122 extends in a first direction parallel to a left and right horizontal direction in the context of the figure, for example, and the gate electrode 124 is connected to the gate line 122. A gate insulating layer 126 is formed on the gate line 122 and the gate electrode 124 substantially all over the substrate 120.

A semiconductor layer 128 is formed on the gate insulating layer 126 corresponding to the gate electrode 124. A source electrode 132 and a drain electrode 134 are formed on both ends of the semiconductor layer 128 and are spaced apart from each other.

A data line 130 is formed on the gate insulating layer 126 in a second direction parallel to an up and down vertical direction in the context of the figure, for example. The data line 130 crosses the gate line 122 to thereby define the pixel region P, and the source electrode 132 is connected to the data line 130.

Here, the gate electrode 124, the semiconductor layer 128, the source electrode 132 and the drain electrode 134 constitute a thin film transistor T.

A passivation layer 136 is formed on the thin film transistor T substantially all over the substrate 120. A pixel electrode 140 and a common electrode 142 are formed on the passivation layer 136 in the pixel region P and are spaced apart from each other.

Here, the passivation layer 136 has a drain contact hole exposing the drain electrode 134, and the pixel electrode 140 is connected to the drain electrode 134 through the drain contact hole.

In addition, a common line 138 is formed on the passivation layer 136 corresponding to the data line 130 along the second direction, and the common electrode 142 is connected to the common line 138.

At this time, each of the pixel electrode 140 and the common electrode 142 has a straight bar shape without a curved portion. The pixel electrode 140 and the common electrode 142 may be parallel from first ends to second ends that are opposite to the first ends.

In the first embodiment, the pixel electrode 140 and the common electrode 142 are formed in the same layer on the passivation layer 136. Alternatively, in another embodiment, the pixel electrode 140 and the common electrode 142 may be formed in different layers with an inter-insulating layer therebetween. In this instance, the common electrode 142 may be formed over the pixel electrode 140 or the pixel electrode 140 may be formed over the common electrode 142.

Additionally, in another embodiment, one of the pixel electrode 140 and the common electrode 142 may have a plate shape, and the other of the pixel electrode 140 and the common electrode 142 may include a plurality of straight bars or have a plate shape including a plurality of straight slits.

The liquid crystal layer 150 is formed over the pixel electrode 140 and the common electrode 142. The liquid crystal layer 150 includes a plurality of first liquid crystal capsules 152, a plurality of second liquid crystal capsules 156 and a binder 160. The first liquid crystal capsules 152 and the second liquid crystal capsules 156 are dispersed in the binder 160. Each of the first liquid crystal capsules 152 includes a plurality of positive liquid crystal molecules 154, and each of the second liquid crystal capsules 156 includes a plurality of negative liquid crystal molecules 158.

Here, the liquid crystal layer 150 may have a thickness of about 1 μm to about 5 μm. The binder 160 may be transparent or semi-transparent and may have water solubility, fat solubility, or mixed property of water solubility and fat solubility.

The first liquid crystal capsules 152 and the second liquid crystal capsules 156 each may be a polymer capsule having a diameter of nanometer to several hundred nanometers and may be formed of a water soluble material such as poly vinyl alcohol (PVA) or a fat soluble material such as poly methyl methacrylate (PMMA). For example, the first liquid crystal capsules 152 and the second liquid crystal capsules 156 each may have a capsule diameter of about 1 nm to about 320 nm.

The positive liquid crystal molecules 154 and the negative liquid crystal molecules 158 may include at least one of nematic liquid crystal, ferroelectric liquid crystal and flexo electric liquid crystal.

Particularly, the positive liquid crystal molecules 154 each have positive dielectric constant anisotropy ($\Delta\varepsilon=(\varepsilon//-\varepsilon\perp)>0$) in which a dielectric constant of a direction parallel to an electric field is larger than a dielectric constant of a direction perpendicular to the electric field, and the negative liquid crystal molecules 158 each have negative dielectric constant anisotropy ($\Delta\varepsilon=(\varepsilon//-\varepsilon\perp)<0$) in which a dielectric constant of a direction parallel to the electric field is smaller than a dielectric constant of a direction perpendicular to the electric field.

Accordingly, the positive liquid crystal molecules 154 are rearranged such that their long axes are parallel to the direction of the electric field, and the negative liquid crystal molecules 158 are rearranged such that their long axes are perpendicular to the direction of the electric field.

For instance, the positive liquid crystal molecules 154 may have refractive index anisotropy $\Delta n$ of about 0 to about 0.4, more beneficially, about 0 to about 0.2, and dielectric constant anisotropy $\Delta\varepsilon$ of about 0 to about 200, more beneficially, about 0 to about 20. The positive liquid crystal molecules 154 may have a relatively high Kerr constant and a volumetric ratio of about 5% to about 75% with respect to the liquid crystal layer 150.

The negative liquid crystal molecules 158 may have refractive index anisotropy $\Delta n$ of about 0 to about 0.3, more beneficially, about 0 to about 0.2, and dielectric constant anisotropy $\Delta\varepsilon$ of about −10 to about 0, more beneficially, about −5 to about 0. The negative liquid crystal molecules 158 may have a relatively low Kerr constant and a volumetric ratio of about 95% to about 25% with respect to the liquid crystal layer 150.

The liquid crystal layer 150 may be formed by a soluble process such as a printing method, an ink-jetting method and a transferring method.

Since the first liquid crystal capsules 152 and the second liquid crystal capsules 156 include the positive liquid crystal molecules 154 and the negative liquid crystal molecules 158, respectively, the first liquid crystal capsules 152 and the second liquid crystal capsules 156 can operate independently without influence on each other while maintaining uniform properties.

Accordingly, the first liquid crystal capsules 152 having properties of the positive liquid crystal molecules 154 and the second liquid crystal capsules 156 having properties of the negative liquid crystal molecules 158 can be formed in the single liquid crystal layer 150, and the color shift can be improved.

In addition, a first polarizing layer 162 is formed under the substrate 120, and a second polarizing layer 164 is formed on the liquid crystal layer 150.

Here, the second polarizing layer 164 may be an in-cell type. For example, the in-cell type second polarizing layer 164 may include supramolecular complexes of a disc shape or a plurality of organic compounds and may be formed on the liquid crystal layer 150 by a coating method such as a nozzle coating method and a spin coating method.

In the TFT-LCD device 110 including liquid crystal capsules, the first liquid crystal capsules 152 including the positive liquid crystal molecules 154 have effective refractive index anisotropy of a different direction from the second liquid crystal capsules 156 including the negative liquid crystal molecules 158. Thus, birefringence is caused along different directions in the liquid crystal layer 150, and the color shift according to the viewing angles can be improved. This will be described with reference to drawings.

Figure 4A:
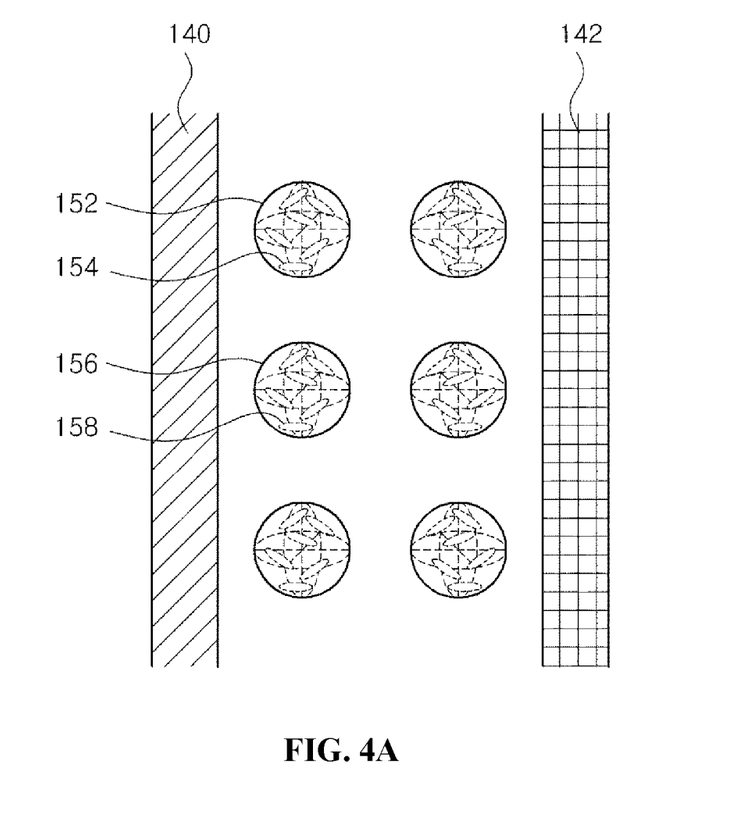
FIGS. 4A and 4B are schematic plan views of an TFT-LCD device including liquid crystal capsules according to the first embodiment of the present disclosure when an electric field is not generated and when an electric field is generated, respectively.
Figure 4B:
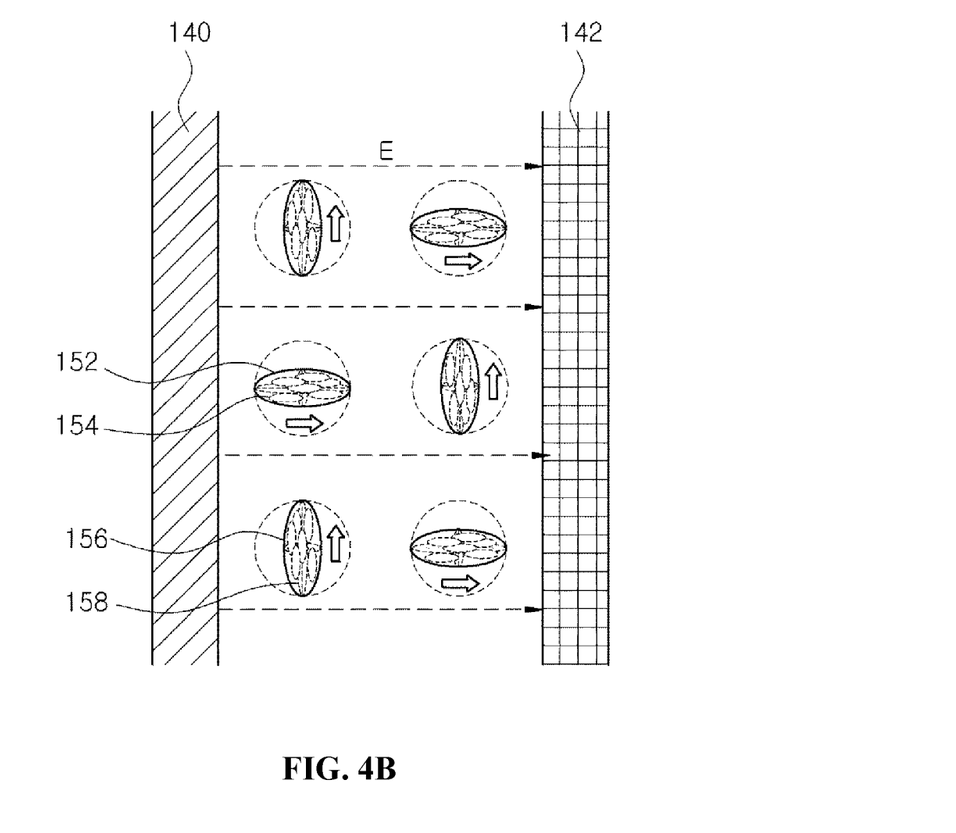

FIGS. 4A and 4B are schematic plan views of an TFT-LCD device including liquid crystal capsules according to the first embodiment of the present disclosure when an electric field is not generated and when an electric field is generated, respectively. A description will be given with reference to FIGS. 2 and 3 together.

In FIG. 4A, when a voltage is not applied to the pixel electrode 140 and the common electrode 142 and an electric field is not generated between the pixel electrode 140 and the common electrode 142, the positive liquid crystal molecules 154 in the first liquid crystal capsules 152 are randomly arranged. Birefringence is not caused in the first liquid crystal capsules 152, and the first liquid crystal capsules 152 have refractive index isotropy. In addition, the negative liquid crystal molecules 158 in the second liquid crystal capsules 156 are randomly arranged. Birefringence is not caused in the second liquid crystal capsules 156, and the second liquid crystal capsules 156 have refractive index isotropy.

Therefore, the liquid crystal layer 150 has refractive index isotropy. A normally black mode TFT-LCD device 110, where transmission axes of the first and second polarizing layers 162 and 164 are perpendicular to each other, displays black, and a normally white mode TFT-LCD device 110, where transmission axes of the first and second polarizing layers 162 and 164 are parallel to each other, displays white.

In FIG. 4B, when a voltage is applied to the pixel electrode 140 and the common electrode 142 and an electric field E, which is parallel to the substrate 120 and perpendicular to the straight bar shape of the pixel electrode 140 and the common electrode 142, is generated between the pixel electrode 140 and the common electrode 142, the positive liquid crystal molecules 154 in the first liquid crystal capsules 152 are arranged such that their long axes are parallel to the electric field E. Birefringence, where a refractive index in a direction parallel to the electric field E is larger a refractive index in a direction perpendicular to the electric field E, is caused in each of the first liquid crystal capsules 152, and the first liquid crystal capsules 152 have effective refractive index anisotropy along the direction parallel to the electric field E. On the other hand, the negative liquid crystal molecules 158 in the second liquid crystal capsules 156 are arranged such that their long axes are perpendicular to the electric field E. Birefringence where a refractive index in the direction perpendicular to the electric field E is larger than a refractive index in the direction parallel to the electric field E is caused in each of the second liquid crystal capsules 156, and the second liquid crystal capsules 156 have effective refractive index anisotropy along the direction perpendicular to the electric field E.

Accordingly, the liquid crystal layer 150 has refractive index anisotropy, and the TFT-LCD device 110 can display different gray levels from black or white.

At this time, since the liquid crystal layer 150 includes the first liquid crystal capsules 152 having the effective refractive index anisotropy along the direction parallel to the electric field E and the second liquid crystal capsules 156 having the effective refractive index anisotropy along the direction perpendicular to the electric field E, the liquid crystal layer 150 has substantially the same effective refractive index according to the viewing angles. The difference in colors is decreased, and the color shift is improved.

Here, the positive liquid crystal molecules 154 and the negative liquid crystal molecules 158 are rearranged along the direction parallel to and the direction perpendicular to the electric field E, respectively, with respect to all driving voltages. Thus, the color shift is improved at all gray levels as well as at the black or specific gray level.

In addition, since the pixel electrode 140 and the common electrode 142 each have the straight bar shape, an area that is not used for displaying an image is minimized, and the aperture ratio and the transmittance are increased.

For instance, when there are 12 blocks between the pixel electrode 140 and common electrode 142 in the pixel region P and the distance between the pixel electrode 140 and the common electrode 142 is about 5.7 µm, the aperture ratio increases to about 50.76%, and the transmittance increases to about 107% as compared with the related art TFT-LCD device. When there are 10 blocks between the pixel electrode 140 and common electrode 142 in the pixel region P and the distance between the pixel electrode 140 and the common electrode 142 is about 7.2 µm, the aperture ratio increases to about 55.92%, and the transmittance increases to about 118% as compared with the related art TFT-LCD device. When there are 8 blocks between the pixel electrode 140 and common electrode 142 in the pixel region P and the distance between the pixel electrode 140 and the common electrode 142 is about 9.5 µm, the aperture ratio increases to about 58.92%, and the transmittance increases to about 124% as compared with the related art TFT-LCD device.

Meanwhile, the positive liquid crystal molecules 154 are rearranged such that their long axes are aligned in the direction parallel to the electric field E, and thus the first liquid crystal capsules 152 including the positive liquid crystal molecules 154 can be manufactured without any restrictions.

On the other hand, the negative liquid crystal molecules 158 are rearranged such that their long axes are aligned in the direction perpendicular to the electric field E. At this time, the direction perpendicular to the electric field E may be a direction parallel to the substrate 120 or a direction perpendicular to the substrate 120. Therefore, if the second liquid crystal capsules 156 are arbitrarily manufactured, the negative liquid crystal molecules 158 may be rearranged such that their long axes may be aligned in a direction nonparallel to the substrate 120, i.e., the direction perpendicular to the substrate 120, and the liquid crystal layer 150 cannot have the effective refractive index anisotropy along a desirable direction.

To allow the second liquid crystal capsules 156 to have the effective refractive index anisotropy along a desirable direction, the negative liquid crystal molecules 158 should be rearranged such that their long axes are parallel to the substrate 120 and perpendicular to the electric field E. Thus, it is beneficial that when the electric field E is not generated, the negative liquid crystal molecules 158 in the second liquid crystal capsules 156 are randomly arranged while their long axes are parallel to the substrate 120.

By experiments, it could be noticed that most of the negative liquid crystal molecules 158 are arranged parallel to the substrate 120 when the electric field is not generated and the second liquid crystal capsules 156 have thickness-direction phase retardation (Rth) less than 0 (Rth<0). Here, when a plane parallel to the substrate 120 is formed by the x-axis and the y-axis, and the direction perpendicular to the substrate 120 is the z-axis perpendicular to the x-axis and the y-axis, the thickness-direction phase retardation (Rth) is the phase retardation of the z-axis.

Beneficially, the second liquid crystal capsules 156 each have a sphere shape with diameters of the x-axis and the y-axis larger than a diameter of the z-axis, the anchoring energy in each of the second liquid crystal capsules 156 is relatively high, and the size of each of the second liquid crystal capsules 156 is relatively small so that the thickness-direction phase retardation Rth of the second liquid crystal capsules 156 have a value less than 0.

In the meantime, it is desirable that first effective refractive index anisotropy $\Delta n1_{eff}$ of the first liquid crystal capsules 152 is the same as second effective refractive index anisotropy $\Delta n2_{eff}$ in order to improve the color shift. The first effective refractive index anisotropy $\Delta n1_{eff}$ and the second effective refractive index anisotropy $\Delta n2_{eff}$ can be expressed by multiplication of dielectric constant anisotropy, refractive index anisotropy and a volumetric ratio as follows.

$$\Delta n1_{eff}=(\Delta \varepsilon 1)*(\Delta n1)*(LC\ \text{ratio}1)$$

$$\Delta n2_{eff}=(\Delta \varepsilon 2)*(\Delta n2)*(LC\ \text{ratio}2)$$

Accordingly, when the positive liquid crystal molecules 154 and the negative liquid crystal molecules 158 have the same Kerr constant, it is beneficial that the first liquid crystal capsules 152 and the second liquid crystal capsules 156 have the same volumetric ratio.

Since the Kerr constant of the positive liquid crystal molecules 154 is relatively larger than the Kerr constant of the negative liquid crystal molecules 158 in the known materials so far, it can be beneficial that the volumetric ratio of the second liquid crystal capsules 156 is larger than the volumetric ratio of the first liquid crystal capsules 152.

A method of forming the liquid crystal layer 150 including the liquid crystal capsules will be described.

The first liquid crystal capsules 152 including the positive liquid crystal molecules 154 are formed by mixing the positive liquid crystal molecules 154 and first capsule materials. The second liquid crystal capsules 156 including the negative liquid crystal molecules 158 are formed by mixing the negative liquid crystal molecules 158 and second capsule materials. After that, the first liquid crystal capsules 152 and the second liquid crystal capsules 156 are mixed with the binder 160, thereby forming a liquid crystal capsule solution.

Then, the liquid crystal capsule solution is applied to the substrate 120 including the thin film transistor T, the pixel electrode 140 and the common electrode 142 thereon through a soluble process such as a printing method, an ink-jetting method, and a transferring method, and is dried and hardened, thereby completing the liquid crystal layer 150.

In this instance, the first liquid crystal capsules 152 and the second liquid crystal capsules 156 can be randomly disposed in the liquid crystal layer 150.

Like this, in the TFT-LCD device 110 including liquid crystal capsules according to the first embodiment of the present disclosure, the liquid crystal layer 150 is formed of the first liquid crystal capsules 152 including the positive liquid crystal molecules 154 and the second liquid crystal capsules 156 including the negative liquid crystal molecules 158, and the refractive index of the liquid crystal layer 150 is substantially the same according to the viewing angles. Thus, the difference in colors is decreased, and the color shift is improved.

Moreover, since the liquid crystal layer 150 is formed of the first liquid crystal capsules 152 of the positive liquid crystal molecules 154 and the second liquid crystal capsules 156 of the negative liquid crystal molecules 158 and the pixel electrode 140 and the common electrode 142 each have the straight bar shape without a curved portion, the aperture ratio and the transmittance are increased as well as the color shift is improved and is autonomously compensated.

In the first embodiment, the first liquid crystal capsules 152 of the positive liquid crystal molecules 154 and the second liquid crystal capsules 156 of the negative liquid crystal molecules 158 are randomly disposed in the pixel region P. In another embodiment, the first liquid crystal capsules of the positive liquid crystal molecules and the second liquid crystal capsules of the negative liquid crystal molecules may be separately disposed in the pixel region, and this will be described with reference to drawings.

Figure 5:
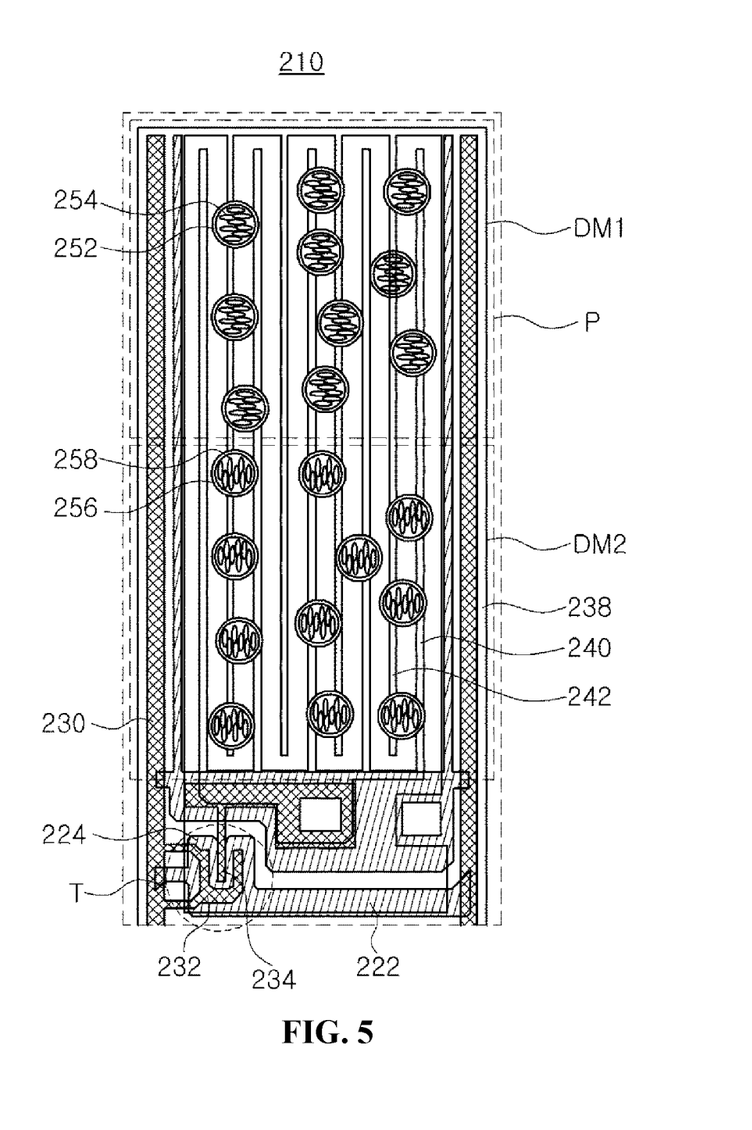
FIG. 5 is a schematic view of an TFT-LCD device including liquid crystal capsules according to a second embodiment of the present disclosure.

FIG. 5 is a schematic view of an TFT-LCD device including liquid crystal capsules according to a second embodiment of the present disclosure. Explanation for the same parts as the first embodiment will be omitted or simplified.

In FIG. 5, the TFT-LCD device 210 including liquid crystal capsules according to the second embodiment of the present disclosure comprises a substrate including a plurality of pixel regions P, a liquid crystal layer (not shown) over the substrate and a backlight unit under the substrate. The substrate and the liquid crystal layer constitute a liquid crystal panel.

More specifically, a gate line 222 and a gate electrode 224 are formed on the substrate. The gate line 222 extends in a first direction parallel to a left and right horizontal direction in the context of the figure, for example, and the gate electrode 224 is connected to the gate line 222. A gate insulating layer is formed on the gate line 222 and the gate electrode 224 substantially all over the substrate.

A semiconductor layer is formed on the gate insulating layer corresponding to the gate electrode 224. A source electrode 232 and a drain electrode 234 are formed on both ends of the semiconductor layer and are spaced apart from each other.

A data line 230 is formed on the gate insulating layer in a second direction parallel to an up and down vertical direction in the context of the figure, for example. The data line 230 crosses the gate line 222 to thereby define the pixel region P, and the source electrode 232 is connected to the data line 230.

Here, the gate electrode 224, the semiconductor layer, the source electrode 232 and the drain electrode 234 constitute a thin film transistor T.

A passivation layer is formed on the thin film transistor T substantially all over the substrate. A pixel electrode 240 and a common electrode 242 are formed on the passivation layer in the pixel region P and are spaced apart from each other.

Here, the passivation layer has a drain contact hole exposing the drain electrode 234, and the pixel electrode 240 is connected to the drain electrode 234 through the drain contact hole.

In addition, a common line 238 is formed on the passivation layer corresponding to the data line 230 along the second direction, and the common electrode 242 is connected to the common line 238.

Each of the pixel electrode 240 and the common electrode 242 has a straight bar shape without a curved portion.

The liquid crystal layer is formed over the pixel electrode 240 and the common electrode 242. The liquid crystal layer includes a plurality of first liquid crystal capsules 252, a plurality of second liquid crystal capsules 256 and a binder. The first liquid crystal capsules 252 and the second liquid crystal capsules 256 are dispersed in the binder. Each of the first liquid crystal capsules 252 includes a plurality of positive liquid crystal molecules 254, and each of the second liquid crystal capsules 256 includes a plurality of negative liquid crystal molecules 258.

Here, the pixel region P is divided into a first domain DM1 of an upper half area and a second domain DM2 of a lower half area in the context of the figure. The first liquid crystal capsules 252 are disposed in the first domain DM1 and the second liquid crystal capsules 256 are disposed in the second domain DM2.

The liquid crystal layer 250 in the pixel region P may have a thickness of about 1 µm to about 5 µm. The binder may be transparent or semi-transparent and may have water solubility, fat solubility, or mixed property of water solubility and fat solubility.

The first liquid crystal capsules 252 and the second liquid crystal capsules 256 each may be a polymer capsule having a diameter of nanometer to several hundred nanometers and may be formed of a water soluble material such as poly vinyl alcohol (PVA) or a fat soluble material such as poly methyl methacrylate (PMMA). For example, the first liquid crystal capsules 252 and the second liquid crystal capsules 256 each may have a capsule diameter of about 1 nm to about 320 nm.

The positive liquid crystal molecules 254 and the negative liquid crystal molecules 258 may include at least one of nematic liquid crystal, ferroelectric liquid crystal and flexo electric liquid crystal.

Particularly, the positive liquid crystal molecules 254 each have positive dielectric constant anisotropy ($\Delta\varepsilon=(\varepsilon// - \varepsilon\perp)>0$) in which a dielectric constant of a direction parallel to an electric field is larger than a dielectric constant of a direction perpendicular to the electric field, and the negative liquid crystal molecules 258 each have negative dielectric constant anisotropy ($\Delta\varepsilon=(\varepsilon//-\varepsilon\bot)<0$) in which a dielectric constant of a direction parallel to the electric field is smaller than a dielectric constant of a direction perpendicular to the electric field.

Accordingly, the positive liquid crystal molecules 254 are rearranged such that their long axes are parallel to the direction of the electric field, and the negative liquid crystal molecules 258 are rearranged such that their long axes are perpendicular to the direction of the electric field.

For instance, the positive liquid crystal molecules 254 may have refractive index anisotropy $\Delta n$ of about 0 to about 0.4, more beneficially, about 0 to about 0.2, and dielectric constant anisotropy $\Delta\varepsilon$ of about 0 to about 200, more beneficially, about 0 to about 20. The positive liquid crystal molecules 254 may have a relatively high Kerr constant and a volumetric ratio of about 5% to about 75% with respect to the liquid crystal layer.

The negative liquid crystal molecules 258 may have refractive index anisotropy $\Delta n$ of about 0 to about 0.3, more beneficially, about 0 to about 0.2, and dielectric constant anisotropy $\Delta\varepsilon$ of about −10 to about 0, more beneficially, about −5 to about 0. The negative liquid crystal molecules 258 may have a relatively low Kerr constant and a volumetric ratio of about 95% to about 25% with respect to the liquid crystal layer.

Since the first liquid crystal capsules 252 and the second liquid crystal capsules 256 include the positive liquid crystal molecules 254 and the negative liquid crystal molecules 258, respectively, the first liquid crystal capsules 252 and the second liquid crystal capsules 256 can operate independently without influence on each other while maintaining uniform properties.

Accordingly, the first liquid crystal capsules 252 having properties of the positive liquid crystal molecules 254 and the second liquid crystal capsules 256 having properties of the negative liquid crystal molecules 258 can be formed in the single liquid crystal layer, and the color shift can be improved.

Meanwhile, the positive liquid crystal molecules 254 are rearranged such that their long axes are aligned in the direction parallel to the electric field, and thus the first liquid crystal capsules 252 including the positive liquid crystal molecules 254 can be manufactured without any restrictions.

On the other hand, the negative liquid crystal molecules 258 are rearranged such that their long axes are aligned in the direction perpendicular to the electric field. At this time, the direction perpendicular to the electric field may be a direction parallel to the substrate or a direction perpendicular to the substrate. Therefore, if the second liquid crystal capsules 256 are arbitrarily manufactured, the negative liquid crystal molecules 258 may be rearranged such that their long axes may be aligned in a direction nonparallel to the substrate, i.e., the direction perpendicular to the substrate, and the liquid crystal layer cannot have the effective refractive index anisotropy along a desirable direction.

To allow the second liquid crystal capsules 256 to have the effective refractive index anisotropy along a desirable direction, the negative liquid crystal molecules 258 should be rearranged such that their long axes are parallel to the substrate and perpendicular to the electric field. Thus, it is beneficial that when the electric field is not generated, the negative liquid crystal molecules 258 in the second liquid crystal capsules 256 are randomly arranged while their long axes are parallel to the substrate.

By experiments, it could be noticed that most of the negative liquid crystal molecules 258 are arranged parallel to the substrate when the electric field is not generated and the second liquid crystal capsules 256 have thickness-direction phase retardation (Rth) less than 0 (Rth<0). Here, when a plane parallel to the substrate is formed by the x-axis and the y-axis and the direction perpendicular to the substrate is the z-axis perpendicular to the x-axis and the y-axis, the thickness-direction phase retardation (Rth) is the phase retardation of the z-axis.

Beneficially, the second liquid crystal capsules 256 each have a sphere shape with diameters of the x-axis and the y-axis larger than a diameter of the z-axis, the anchoring energy in each of the second liquid crystal capsules 256 is relatively high, and the size of each of the second liquid crystal capsules 256 is relatively small so that the thickness-direction phase retardation Rth of the second liquid crystal capsules 156 have a value less than 0.

A method of forming the liquid crystal layer including the liquid crystal capsules according to the embodiment of the present invention will be described.

After the first liquid crystal capsules 252 including the positive liquid crystal molecules 254 are formed by mixing the positive liquid crystal molecules 254 and first capsule materials, the first liquid crystal capsules 252 are mixed with the binder, thereby forming a first liquid crystal capsule solution.

Then, the first liquid crystal capsule solution is applied to the first domain DM1 of each pixel region P on the substrate including the thin film transistor T, the pixel electrode 240 and the common electrode 242 thereon through a soluble process such as a printing method, an ink-jetting method, and a transferring method, and is dried and hardened, thereby completing the liquid crystal layer in the first domain DM1.

Additionally, after the second liquid crystal capsules 256 including the negative liquid crystal molecules 258 are formed by mixing the negative liquid crystal molecules 258 and second capsule materials, the second liquid crystal capsules 256 are mixed with the binder, thereby forming a second liquid crystal capsule solution.

Then, the second liquid crystal capsule solution is applied to the second domain DM2 of each pixel region P on the substrate including the thin film transistor T, the pixel electrode 240 and the common electrode 242 thereon through a soluble process such as a printing method, an ink-jetting method, and a transferring method, and is dried and hardened, thereby completing the liquid crystal layer in the second domain DM2.

In this instance, the first liquid crystal capsules 252 and the second liquid crystal capsules 256 of the liquid crystal layer can be disposed in the first domain DM1 and the second domain DM2 of the pixel region P, respectively.

Like this, in the TFT-LCD device 210 including liquid crystal capsules according to the second embodiment of the present disclosure, the liquid crystal layer is formed of the first liquid crystal capsules 252 including the positive liquid crystal molecules 254 and the second liquid crystal capsules 256 including the negative liquid crystal molecules 258, and the refractive index of the liquid crystal layer is substantially the same according to the viewing angles. Thus, the difference in colors is decreased, and the color shift is improved and is autonomously compensated.

Moreover, since the liquid crystal layer is formed of the first liquid crystal capsules 252 of the positive liquid crystal molecules 254 and the second liquid crystal capsules 256 of the negative liquid crystal molecules 258 and the pixel electrode 240 and the common electrode 242 each have the straight bar shape without a curved portion, the aperture ratio and the transmittance are increased as well as the color shift is improved.

It will be apparent to those skilled in the art that various modifications and variations can be made in a display device of the present disclosure without departing from the spirit or scope of the embodiments. Thus, it is intended that the present disclosure covers the modifications and variations of this invention provided they come within the scope of the appended claims and their equivalents.

What is claimed is:

1. A liquid crystal display device comprising:
   a substrate;
   a pixel electrode and a common electrode both provided without a curved portion in a pixel region on the substrate to increase an aperture ratio, spaced apart from each other, and extending in a second direction that is perpendicular to a first direction; and
   a liquid crystal layer on the pixel electrode and the common electrode, and including a first liquid crystal capsule and a second liquid crystal capsule,
   wherein the first liquid crystal capsule only includes first liquid crystal molecules each having a first long axis and positive dielectric constant anisotropy and the second liquid crystal capsule only includes second liquid crystal molecules each having a second long axis and negative dielectric constant anisotropy, and
   wherein first long axes of the first liquid crystal molecules are all parallel to the first direction and second long axes of the second liquid crystal molecules are all parallel to the second direction.

2. The liquid crystal display device of claim 1, wherein the first and second liquid crystal capsules are randomly disposed in the pixel region.

3. The liquid crystal display device of claim 1, wherein the pixel region is divided into first and second domains, and the first and second liquid crystal capsules are disposed in the first and second domains, respectively.

4. The liquid crystal display device of claim 1, wherein the second liquid crystal capsule has a thickness-direction phase retardation of less than 0.

5. The liquid crystal display device of claim 1, wherein the second liquid crystal capsule has a shape with diameters of x-axis and y-axis forming a plane parallel to the substrate, and is larger than a diameter of z-axis perpendicular to the x-axis and the y-axis.

6. The liquid crystal display device of claim 1, wherein the first liquid crystal molecules have refractive index anisotropy of 0 to 0.4, dielectric constant anisotropy of 0 to 200, and a volumetric ratio of 5% to 75% with respect to the liquid crystal layer.

7. The liquid crystal display device of claim 1, wherein the second liquid crystal molecules have refractive index anisotropy of 0 to 0.3, dielectric constant anisotropy of −10 to 0, and a volumetric ratio of 95% to 25% with respect to the liquid crystal layer.

8. The liquid crystal display device of claim 1, wherein each of the pixel electrode and the common electrode has a straight bar shape.

9. A method of fabricating a liquid crystal display device, the method comprising:
   forming a pixel electrode and a common electrode without a curved portion in a pixel region on a substrate to increase an aperture ratio, the pixel electrode and the common electrode being spaced apart from each other and extending in a second direction that is perpendicular to a first direction; and
   forming a liquid crystal layer on the pixel electrode and the common electrode, the liquid crystal layer including a first liquid crystal capsule and a second liquid crystal capsule,
   wherein the first liquid crystal capsule only includes first liquid crystal molecules each having a first long axis and positive dielectric constant anisotropy crystal and the second liquid crystal capsule only includes second liquid crystal molecules each having a second long axis and negative dielectric constant anisotropy, and
   wherein first long axes of the first liquid crystal molecules are all parallel to the first direction and second long axes of the second liquid crystal molecules are all parallel to the second direction.

10. The method of claim 9, wherein the forming the liquid crystal layer includes:
    forming the first liquid crystal capsule by mixing the first liquid crystal molecules and a first capsule material;
    forming the second liquid crystal capsule by mixing the second liquid crystal molecules and a second capsule material;
    forming a liquid crystal capsule solution by mixing the first and second liquid crystal capsules and a binder; and
    applying the liquid crystal capsule solution to the substrate.

11. The method of claim 9, wherein the forming the liquid crystal layer includes:
    forming the first liquid crystal capsule by mixing the first liquid crystal molecules and a first capsule material;
    forming a first liquid crystal capsule solution by mixing the first liquid crystal capsule and a binder;
    applying the first liquid crystal capsule solution to a first domain of the pixel region on the substrate;
    forming the second liquid crystal capsule by mixing the second liquid crystal molecules and a second capsule material;
    forming a second liquid crystal capsule solution by mixing the second liquid crystal capsule and a binder; and
    applying the second liquid crystal capsule solution to a second domain of the pixel region on the substrate.

12. A liquid crystal display device comprising:
    a first substrate;
    a second substrate;
    a pixel electrode and a common electrode both disposed without a curved portion in a pixel region on the first substrate to increase an aperture ratio and being parallel from first ends of the pixel electrode and the common electrode to second ends of the pixel electrode and the common electrode that are opposite to the first ends to extend in a second direction that is perpendicular to a first direction; and
    a liquid crystal capsule solution disposed between the first and second substrates, and including a binder, a first liquid crystal capsule and a second liquid crystal capsule,
    wherein the first liquid crystal capsule only includes first liquid crystal molecules each having a first long axis and positive dielectric constant anisotropy and the second liquid crystal capsule only includes second liquid crystal molecules each having a second long axis and negative dielectric constant anisotropy, and
    wherein first long axes of the first liquid crystal molecules are all parallel to the first direction and second long axes of the second liquid crystal molecules are all parallel to the second direction.

13. The liquid crystal display device of claim 12, wherein the first and second liquid crystal capsules are dispersed in the liquid crystal capsule solution.

14. The liquid crystal display device of claim 12, wherein the pixel region is divided into first and second domains, and the first and second liquid crystal capsules are disposed in the first and second domains, respectively.

15. The liquid crystal display device of claim 12, wherein the second liquid crystal capsule has a thickness-direction phase retardation of less than 0.

16. The liquid crystal display device of claim 12, wherein the second liquid crystal capsule has a shape with diameters of x-axis and y-axis forming a plane parallel to the substrate, and is larger than a diameter of z-axis perpendicular to the x-axis and the y-axis.

17. The liquid crystal display device of claim 12, wherein the first liquid crystal molecules have refractive index anisotropy of 0 to 0.4, dielectric constant anisotropy of 0 to 200, and a volumetric ratio of 5% to 75% with respect to the liquid crystal capsule solution.

18. The liquid crystal display device of claim 12, wherein the second liquid crystal molecules have refractive index anisotropy of 0 to 0.3, dielectric constant anisotropy of −10 to 0, and a volumetric ratio of 95% to 25% with respect to the liquid crystal capsule solution.

19. The liquid crystal display device of claim 12, wherein the second substrate is a polarizing layer.

20. The liquid crystal display device of claim 12, further comprising a data line, wherein the pixel electrode and the common electrode are parallel with the data line from the first ends of the pixel electrode and the common electrode to the second ends of the pixel electrode and the common electrode.

\* \* \* \* \*